United States Patent [19]

Sharaby

[11] Patent Number: 4,963,592
[45] Date of Patent: Oct. 16, 1990

[54] SUPER POROUS LOW MOLECULAR WEIGHT VINYL HALIDE RESINS
[75] Inventor: Zaev Sharaby, South Euclid, Ohio
[73] Assignee: The B. F. Goodrich Company, Akron, Ohio
[21] Appl. No.: 440,551
[22] Filed: Nov. 20, 1989
[51] Int. Cl.⁵ .................................................. C08V 9/20
[52] U.S. Cl. ........................................ 521/56; 521/60; 521/145; 526/204; 526/205; 526/344.2
[58] Field of Search ............... 526/204, 205, 344.2; 521/145, 56, 60

[56] References Cited
U.S. PATENT DOCUMENTS 3,931,248  1/1976  Maekawa et al. .................. 526/75
4,041,017  8/1977  Maekawa et al. .................. 526/320
4,105,839  8/1978  Koyanagi et al. .................. 526/93
4,306,045  12/1981 Yoshida et al. ..................... 526/204
4,539,230  9/1985  Shimizu ............................. 526/62

Primary Examiner—Morton Foelak
Attorney, Agent, or Firm—Thoburn T. Dunlap

[57] ABSTRACT

A process for producing porous, low molecular weight vinyl polymers and copolymers via suspension polymerization in the presence of a dual function porosifier/low molecular weight modifier is disclosed. The process is especially advantageous in that it can be run at a wide variety of temperatures to obtain super porous, low molecular weight resins. Novel super porous, low molecular weight resins are also disclosed.

8 Claims, 3 Drawing Sheets

SUPER POROUS LOW MOLECULAR WEIGHT VINYL HALIDE RESINS

BACKGROUND OF THE INVENTION

1. Field of the Invention

This invention relates to a method for the production of vinyl chloride polymers or copolymers. More particularly, the invention relates to a method of preparing porous, low molecular weight vinyl chloride polymer or copolymer resins. The instant resins are prepared by polymerizing vinyl halide monomers alone or in combination with comonomers copolymerizable therewith in the presence of a dual function porosifier/molecular weight modifier.

2. Background

Specialty Polyvinyl chloride (PVC) resins for use in applications such as injection molding and extrusion molding to form products that have thin walls, large surface areas, deep draw and/or intricate surface details requires resins that possess high plasticizer absorption capabilities and low molecular weights. Accordingly, porous, low molecular weight resins would be easier to fabricate into finished products because of their low melt viscosities, low shear sensitivity, good heat stability, superior plasticizer absorption, and excellent flow characteristics.

Low molecular weight PVC resins can be produced by polymerization at relatively high temperatures. Conventional high-temperature polymerization methods, however, are undesirable because of the extended gelation time of the resin, inferior flow of the resin in molding, and increased amounts of residual vinyl chloride monomer absorbed into the nascent resin particles during polymerization. Moreover, high temperatures, i.e., above about 65° C., are generally detrimental to the formation of porous resins. In order to overcome these drawbacks, molecular weight modifiers (chain transfer agents) and porosifiers are used to control the molecular weights and porosities of the polymers, thereby forming resins having the desired physical properties.

A wide variety of compounds have been employed as molecular weight modifiers in the production of polyvinyl chloride resins. Among these, certain mercaptan containing compounds have been employed in several known methods to control the molecular weight of PVC resins. For example, U.S. Pat. No. 4,189,552 discloses the use of 2-mercaptoethanol as a molecular weight modifier in the suspension polymerization of vinyl chloride. The '552 patent teaches that the introduction of mercapto compounds into the reaction medium at a time when the monomer conversion is less than 1% produces adverse effects on particle characteristics. Because of the detrimental effects that mercapto compounds have on colloidal stability, these compounds must be added portionwise (metering) and in low concentrations (under 0.03 part per 100 parts monomer) during the course of polymerization in order to prevent a course or solid charge.

To overcome this problem U.S. Pat. No. 4,797,458 discloses a method wherein the mercaptan is encapsulated in a non-polymerizable material which is miscible with the mercaptan and is substantially insoluble in water. Suitable non-polymerizable materials include dioctylphthalate, low molecular weight poly(caprolactones) and polysilicones, among others. However, this method has its drawbacks in that the molecular weight modifier must be mixed with the non-polymerizable material before addition into the reaction medium.

In a similar approach, U.S. Pat. No. 4,013,824 discloses the use of certain organosulphur molecular weight modifiers including mercaptothiazoles and 2-mercaptobenzothiazoles. Again, this system has its drawbacks in that the modifier must be mixed with an emulsifying additive before the onset of polymerization. Moreover, the disclosed process relates to an emulsion polymerization method wherein the molecular weight modifier is coagitated within an emulsifier and a hydrocarbon diluent prior to the initiation of the polymerization reaction.

U.S. Pat. Nos. 3,945,958; 3,951,925; and 4,695,616 all disclose attempts to produce vinyl chloride polymers and copolymers having improved porosity. However, the methods disclosed therein require extremely specific suspending agents, catalysts, additives, low polymerization temperatures, as well as strict control over process conditions.

Heretofore, attempts to make super porous, low molecular weight resins at high polymerization temperatures (i.e., above about 65° C.) have been unsuccessful. Moreover, no attempt has been made to produce a super porous, low molecular weight resin by utilizing a dual function molecular weight/porosity modifier.

Accordingly, it would be highly desirable to provide a polymerization process that does not require specific temperature constraints and utilizes a dual function modifier without the need for special handling or additives to produce a super porous, low molecular weight resin.

SUMMARY OF THE INVENTION

It is an object of the present invention to provide a molecular weight modifier/porosifier that can be added directly into the reactor without pre-mixing, emulsifying or encapsulating.

It is another object of this invention to provide porous, low molecular weight resins.

It is a another object of the present invention to provide a method of preparing low molecular weight polymers and copolymers in the presence of a dual function modifier.

It is a further object of this invention to provide a method of making porous, low molecular weight polymer and copolymer resins by aqueous suspension polymerization at temperatures above 40° C.

It is a still further object of this invention to provide a method of making porous, low molecular weight polymer and copolymer resins by aqueous suspension polymerization at temperatures above 65° C.

These and other objects of this invention, which will become evident from the disclosure herein, are accomplished by polymerizing vinyl monomers in the presence of a dual function porosifier/molecular weight modifier of the formula:

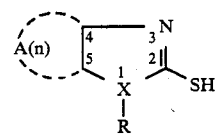

wherein X is N, S or O; R is H or lower alkyl with the proviso that when X is S or O, R is not present; and A, if present, taken together with the carbon atoms to which it is attached represents a benzene ring; and n represents 0 or 1 with the proviso that when n is 0, positions 4 and 5 of the heterocyclic ring are saturated or unsaturated.

DETAILED DESCRIPTION OF THE INVENTION

Figure 1:
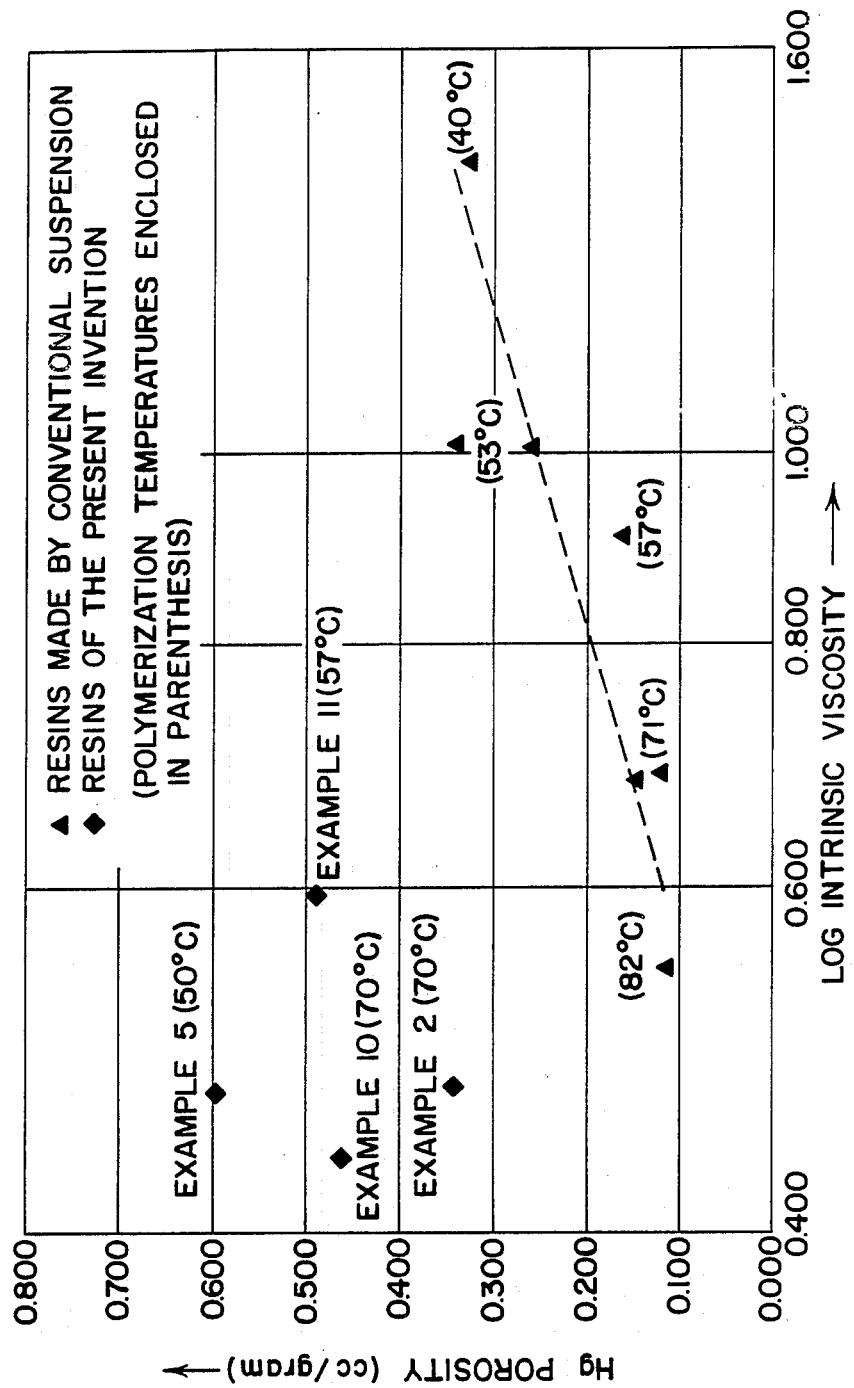
FIG. 1 is a comparative plot of porosity vs. log I.V. for representative resins of the present invention and resins prepared by conventional suspension polymerization techniques.

In the process of the present invention porous, low molecular weight vinyl or vinylidene polymers are produced by aqueous suspension or microsuspension polymerization in the presence of a porosifier/molecular weight modifier (hereinafter referred to as a modifying agent) of formula I. The term lower alkyl as used in formula I above and throughout the specification and claims is defined to mean a branched or linear alkyl group containing up to five carbon atoms. Illustrative, but not limiting, of the modifying agents of formula I that may be utilized in the practice of the present invention are the following compounds:

2-mercapto-1-methylimidazole;
2-mercaptobenzimidazole;
2-mercaptothiazoline;
2-mercaptothiazole;
2-mercaptobenzothiazole;
2-mercaptoxazole;
2-mercaptoxazoline;
2-mercaptobenzoxazole;

While the process of the present invention is specifically illustrated with regard to the preferred suspension polymerization of vinyl chloride, it is to be understood that any polymerizable or copolymerizable vinyl or vinylidiene halide monomer, such as vinyl bromide, vinylidiene chloride and any other vinylidiene halide having at least one terminal $CH_2=C<$ group can also be utilized.

The term polymer as used herein includes homopolymers, as well as copolymers and terpolymers made from two or more copolymerizable monomers. Preferably, the vinyl polymer is a polyvinyl chloride homopolymer. When copolymers are provided, vinyl chloride may be copolymerized with up to 50% of one or more other copolymerizable monomers. Examples of such copolymerizable monomers are the $\alpha, \beta$-olefinically unsaturated carboxylic acids, such as acrylic acid, methacrylic acid, ethacrylic acid and esters thereof, $\alpha$-cyanoacrylic acid, and the like; acrylated polyesters, such as acrylated caprolactones; maleic and fumaric acid and esters thereof; esters of acrylic acid, such as methyl acrylate, ethyl acrylate butyl acrylate, octyl acrylate, cyanoethyl acrylate, and the like; nitriles, such as acrylonitrile and methacrylonitrile; acrylamides, such as methyl acrylamide, N-methylol acrylamide, N-butoxy methacrylamide, and the like; vinyl ethers, such as ethylvinyl ether, chloroethyl vinyl ether, and the like; the vinyl ketones; styrene and styrene derivatives including $\alpha$-methyl styrene, vinyl naphthalene, allyl and vinyl chloroacetate; vinyl esters of aliphatic acids, such as, for example, vinyl acetate, vinyl propionate, vinyl stearate, and the like; vinyl pyridine; N-vinyl pyrrolidone; methyl vinyl ketone; olefins such as ethylene and propylene; and other types of copolymerizable monomers of the types known to those skilled in the art.

Surprisingly, is has been discovered that the polymerization of vinyl chloride can be carried out in the presence of a modifier of formula I without encapsulation or metering of the modifier into the polymerization medium. Additionally, it has been found that the modifiers of formula I function as a porosifier.

In the process of the present invention, a vinyl halide or mixture of vinyl halide with at least one comonomer is suspended in water by the use of suspending agents and agitation. The polymerization is started by means of a free radical generated polymerization initiator. Suspension polymerization techniques are well-known in the art as set forth in the *Encyclopedia of PVC.* Volume 1, pp. 72-126, published by Marcell Dekker, Inc. (1986), and need not been discussed in great detail here.

Examples of suitable suspending agents are polyvinyl alcohol, partially hydrolyzed polyvinyl acetate, cellulose ethers, starch, gelatin, and the like. The level of dispersant used is less than about 2.0 parts by weight, preferably less than about 0.5 part by weight per 100 parts by weight of monomer. Excellent results are obtained from about 0.05 to about 0.3 part by weight of dispersant per 100 parts by weight of monomer.

Examples of suitable free radical polymerization initiators employed are lauroyl peroxide, azobisisobutynitrile benzoyl peroxide, diisopropyl peroxydicarbonate, isopropyl percarbonate sulfonyl peroxide, t-butyl peroxpivalate, t-butyl peroxyacetoate, $\alpha$-cumyl peroxyneodecanoate and mixtures thereof. The particular free radical initiator(s) employed will depend upon the monomeric material(s) being polymerized, the molecular weight and color requirements of the polymer, and the temperature of the polymerization reaction.

Insofar as the amount of initiator(s) employed is concerned, it has been found that an amount in the range of about 0.005 part by weight to about 1.0 part by weight, based on 100 parts by weight of the monomer(s) being polymerized, is satisfactory. It is preferred to employ an amount of initiator(s) in the range of about 0.01 part by weight to about 0.20 part by weight based on 100 parts by weight of monomer(s).

The suspension polymerization process of this invention can be carried out at any temperature which is normal for the monomeric material to be polymerized. A temperature in the range of about 0° C. to about 100° C. can be employed. Preferably a temperature from about 40° C. to about 80° C., more preferably from about 50° C. to about 70° C., and most preferably from about 60° C. to about 70° C. is employed.

Surprisingly, it has been found that porous, low molecular weight resins can still be obtained at processing temperatures above about 65° C. Generally, porosity decreases as the temperature of a polymerization reaction increases. This is illustrated in Table I wherein commercial grade PVC suspension resins were polymerized at increasing temperatures.

TABLE I

| Resin | Polymerization Temp. (°C.) | I.V. | Hg Porosity (cc/g) |
|---|---|---|---|
| A | 40 | 1.40 | 0.31 |
| B | 71 | 0.68 | 0.18 |
| C | 82 | 0.53 | 0.12 |

The modifying agents of formula I which are utilized in the practice of this invention are readily obtainable from commercial sources, such as, for example, the Aldrich Chemical Company, Inc. of Milwaukee, Wisc.

The level of modifier used to make the porous, low molecular weight polymers or copolymers of this invention can range from about 0.01 to 2.0 parts by weight per 100 parts by weight of monomer(s). The preferred levels of modifier for the practice of the present invention range from about 0.2 to about 2.0 parts by weight per 100 parts of monomer(s), and most preferably, from 0.3 to 1.0 part by weight.

Preferably, the modifiers of the present invention are mixed directly into the polymerization medium prior to the onset of polymerization (i.e., before the addition of the polymerization initiator). Alternatively, the modifier can be pre-mixed with the monomer(s) before its introduction into the polymerization reactor or it can be metered into the reactor during the course of the polymerization reaction.

The polymers and copolymers of the present invention have an inherent solution viscosity (I.V.) of from about 0.1 to about 1.0. and preferably from about 0.2 to about 0.7, and most preferably from about 0.2 to about 0.5. The inherent viscosity represents a measure of the polymeric molecular weight and is determined in accordance with ASTM procedure No. D 1243-66.

The porosity of the resin particles made from the process of the present invention range from about 0.10 cc/g to about 1.0 cc/g, preferably from about 0.2 cc/g to about 0.7 cc/g, and most preferably from about 0.3 cc/g to about 0.6 cc/g as measured by the mercury intrusion method as set forth by G. A. Davidson, *Powder Technology*, Vol. 23. pp. 239-244 (1979) which is incorporated herein by reference.

The polymeric resins obtained from the process of the present invention can also contain pigments, fillers, stabilizers, plasticizers and the like which are conventionally present in polymeric molding compositions in conventional quantities. In preparing molding compositions, the ingredients are mixed by conventional procedures used in the production of molded products. For example, the desired resin composition containing the polymer or copolymer resins of the present invention is homogeneously needed by a mill roll, a Banbury mixer, an extruder or the like, and thereafter is fed in the molded step of calendering, extrusion, injection or pressing. In calendering, the composition is continuously fed to the calender and calendered into a film or sheet. In the case of extrusion molding, injection molding or pressed molding, the needed composition may be molded after it is pelletized. The molding conditions herein are the same as the conventional processing conditions for PVC in any specific conditions are not required.

The invention is further illustrated by the examples that follow. In these examples, all parts are parts by weight and all percentages are percentages by weight unless otherwise specified.

EXAMPLES

The PVC homopolymer resins of Examples 1 through 19 were prepared by aqueous suspension polymerization utilizing the modifiers of formula I. The polymerization recipe is set forth in Table II. Each polymerization reaction was conducted in a reactor equipped with agitation and cooling means. The reactions were conducted at 50° or 70° C. unless otherwise specified. In all examples, the modifier was charged directly into the reactor before introduction of the initiator with no detrimental effects on colloidal stability.

TABLE II

| Material | Level (phm) |
|---|---|
| vinyl chloride | 100 |
| water (demineralized) | 1850 |
| hydroxyalkyl cellulose | 0.10–0.15 |
| polyvinyl alcohol* | 0.08–0.10 |
| initiator (ACPND/TBPP)** | variable |
| modifier | variable |

*25 hydrolyzed
**α-cumyl peroxyneodecanoate/t-butyl peroxypivalate

Table III shows the physical properties of the resins produced. Internal solution viscosity (I.V.) is an indication of molecular weight and was measured in accordance with ASTM procedure No. D 1243-66. Porosity values were obtained by the mercury intrusion method as set forth by G. A. Davidson, supra. Average particle size (APS) was determined by ASTM procedure No. D 1929-63.

From the data presented in Table III, it can be seen that porous/low molecular weight (i.e., low I.V.) resins can be produced using an aqueous suspension process. In all Examples, the reactions were colloidally stable even though large amounts of modifier were added directly into the reaction medium without encapsulation, emulsification, or metering.

For comparative purposes, the resin of Example 16 was polymerized in the presence of a conventional chain transfer agent (2-mercaptoethanol) together with what an excessive amount (0.30 phm) of polyvinyl alcohol (25% hydrolyzed) porosifying agent. From the data presented in the Table, it can be seen that a conventional chain transfer agent, even when utilized in excessive amounts of a known porosifier, do not attain the porosity levels of the resins of the present invention.

TABLE III

| | | | | EXAMPLES 1-6 | | | | |
|---|---|---|---|---|---|---|---|---|
| Example | Modifier | Level (phm) | Initiator Level (phm) | Polymerization Temp (°C.) | I.V. | Hg Porosity (cc/g) | APS (μ) | Conversion (Wt. %) |
| 1 | 2-MT | 0.20 | .05/.06 | 70 | .496 | .250 | 88 | 74 |
| 2 | 2-MT | 0.26 | .04/.07 | 70 | .474 | .388 | 90 | 75 |
| 3 | 2-MT | 0.76 | .07/.08 | 70 | .350 | .500 | 92 | 65 |
| 4 | 2-MT | 0.76 | .07/.09 | 70 | .410 | .490 | 179 | 73 |
| 5 | 2-MT | .076 | .07/.09 | 70 | .330 | .500 | 78 | 65 |
| 6 | 2-MT | 0.76 | .13/.04 | 50 | .470 | .630 | 94 | 68 |
| 7 | 2-MT | 1.52 | .07/.12 | 70 | .352 | .660 | 75 | 57 |
| 8 | 2-MBT | 0.43 | .05/.07 | 70 | .455 | .460 | 88 | 70 |

TABLE III-continued

EXAMPLES 1-6

| Example | Modifier | Level (phm) | Initiator Level (phm) | Polymerization Temp (°C.) | I.V. | Hg Porosity (cc/g) | APS (μ) | Conversion (Wt. %) |
|---|---|---|---|---|---|---|---|---|
| 9 | 2-MBT | 0.43 | .05/.08 | 70 | .458 | .400 | 89 | 75 |
| 10 | 2-MBO | 0.39 | .05/.07 | 70 | .497 | .470 | 98 | 70 |
| 11 | 2-MBO | .042 | .04/.07 | 70 | .436 | .440 | 84 | 73 |
| 12 | 2-MBO | 0.42 | .04/.07 | 70 | .458 | .600 | 209 | >65 |
| 13 | 2-MBO | 0.43 | .08/.07 | 57 | .594 | .490 | 106 | 82 |
| 14 | 2-MMI | 0.20 | .05/.06 | 70 | .502 | 1.5 | 238 | 54 |
| 15 | 2-MBI | 0.43 | .05/.08 | 70 | .457 | 1.5 | 230 | 32 |
| 16 | 2-ME* | 0.15 | .04/.07 | 70 | .369 | .190 | >500+ | 62 |
| Control 1 | None | — | — | 40 | 1.40 | .310 | 140 | 65–70 |
| Control 2 | None | — | .012/.03 | 70 | .663 | .138 | 88 | 72 |
| Control 3 | 2-ME** | 0.5 | .13/.04 | 50 | .504 | .256 | 110 | 81 |
| Control 4 | 2-ME*** | 0.17 | .04/.07 | 70 | .44 | .154 | 166 | 77 |

2-MT = 2-mercaptothiazoline
2-MBT = 2-mercaptobenzothiazole
2-MBO = 2-mercaptobenzoxazole
2-MMI = 2-mercapto-1-methylimidazole
2-MBI = 2-mercaptobenzimidazole
2-ME = 2-mercaptoethanol
*Encapsulated in polycaprolactone (@ 0.3 phm) as set forth in U.S. Pat No. 4,797,458
**Encapsulated in Polycaprolactone (@ 1.0 phm) as set forth in U.S. Pat No. 4,797,458
***Encapsulated in Polycaprolactone (@ 0.34 phm) as set forth in U.S. Pat. No. 4,797,458
+Course Charge As polymerization temperatures increase, molecular weight and porosity of a polymer decrease. This phenomenon is exemplified in Control Examples 1 and 2 which were polymerized at 40° C. and 70° C., respectively. This phenomenon also occurs when a conventional chain transfer agent is utilized as in Control Examples 3 and 4. Plots of porosity vs. the log of the I.V. for various resins of the present invention and conventional suspension resins are given in FIG. 1. Porous, low molecular weight resins are obtained, for example, at 50° C. as well as at 70° C.

Figure 2:
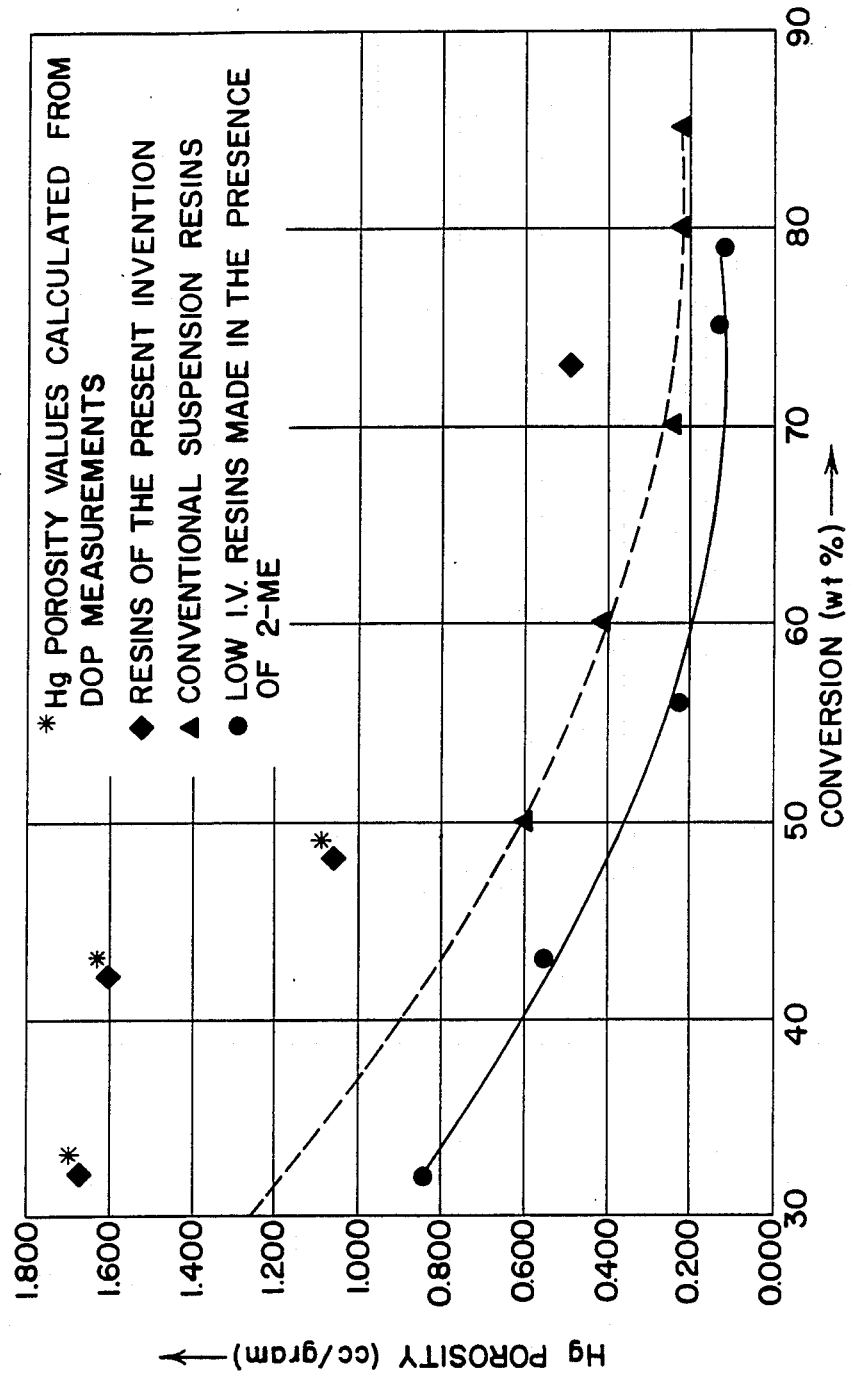
FIG. 2 is a comparative plot of porosity vs. conversion weight of monomer to polymer for representative resins of the present invention and resins prepared by conventional suspension polymerization techniques.

In suspension polymerization, porosity also is a function of the conversion of monomer to polymer. Generally, at low conversion (i.e., early in the polymerization reaction) porosity in the nascent resin particles is greater than resin particles obtained at higher conversions. FIG. 2 shows that even at low conversions, resins made according to the process of the present invention are significantly more porous than resins made by conventional suspension processes.

EXAMPLES 17-19

An important property of PVC resins is the ability to strip the resin of residual vinyl chloride monomer. Generally, the ability to strip PVC of vinyl chloride monomer (VCM desorption) is related to the porosity of the resin. In this example, VCM desorption tests were conducted on the PVC resins of Examples 5, 7 and 12, along with selected commercial resins which were prepared by conventional suspension polymerization. The test results are listed in the Table IV as Examples 17, 18 and 19, respectively. The testing was conducted in accordance with the procedure described by A. Berens, *Polymer Engineering and Science*, Vol. 18, p. 864, (1978).

TABLE IV

| Example | Modifier | I.V. | Hg Porosity (cc/g) |
|---|---|---|---|
| 17 | 2-MT | .330 | .500 |
| 18 | 2-MT | .352 | .660 |
| 19 | 2-MBO | .458 | .600 |
| GEON* resin 110 × 377 | — | .530 | <.160 |
| GEON resin 110 × 334 | — | .680 | <.190 |
| Skinless resin** | — | 1.0 | — |

*GEON is a registered trademark of The B.F. Goodrich Company
**Made in accordance with U.S. Pat. No. 4,757,091

Figure 3:
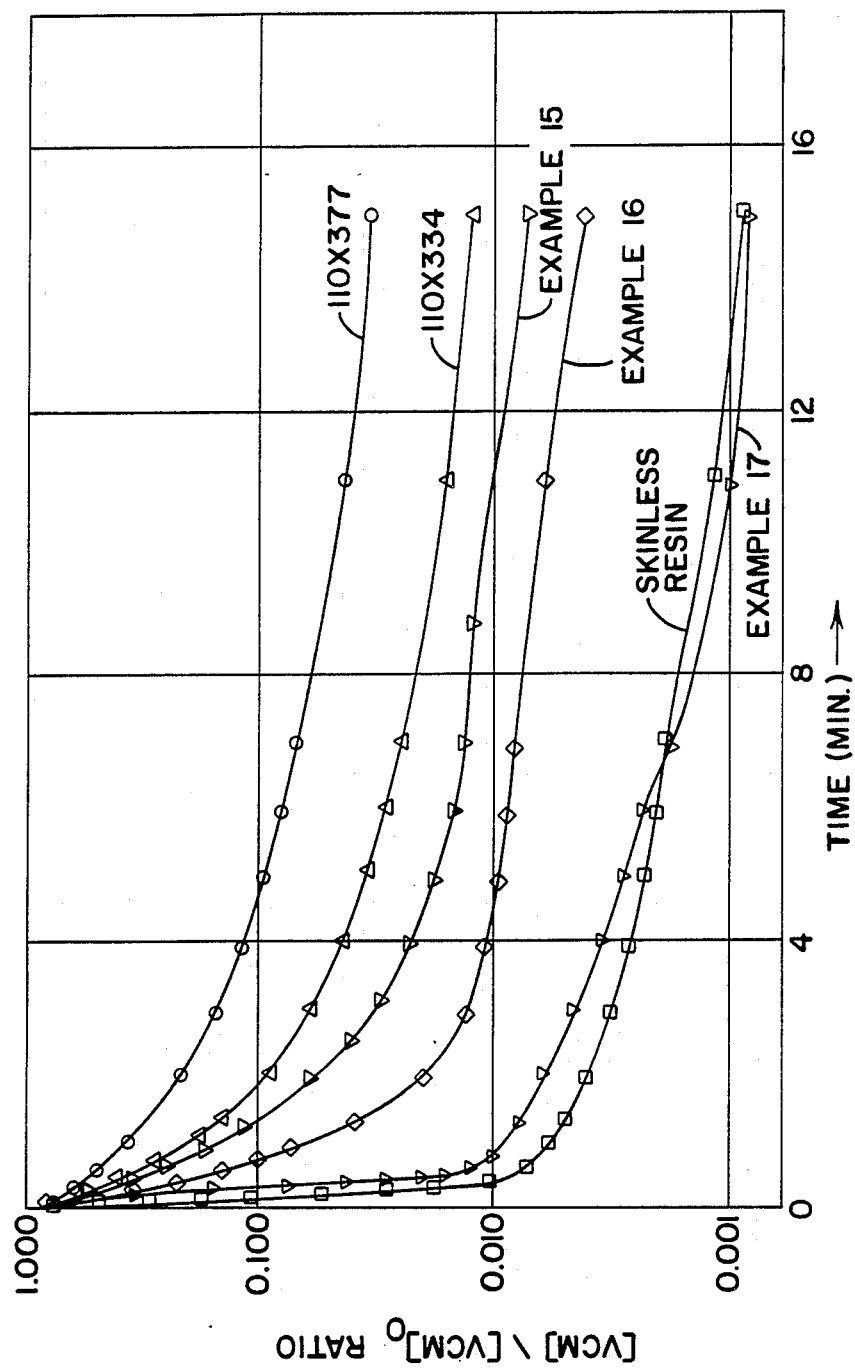
FIG. 3 is a comparative plot illustrating the VCM desorption curves at 90° C. for the resins of the present invention and resins prepared by conventional suspension polymerization techniques.

The resins were saturated to equilibrium with gaseous vinyl chloride monomer. The concentration of the initial VCM absorbed into the resin was 20 to 35 ppm at 90° C., depending on the resin. Monomer desorption was conducted at 90° C. and plotted as the ratio of final VCM concentration ([VCM]) divided by the initial VCM concentration ([VCM]) vs. time. From FIG. 3 it is seen that the VCM description rates of the resins of the present invention are higher than those of low I.V. commercial resins prepared by conventional suspension processes.

What is claimed is:

1. An aqueous suspension polymerization process for producing porous low molecular weight resin particles having an I.V. of from about 0.1 to about 1.0 and a porosity of from about 0.1 cc/g to about 1.0 cc/g as measured by mercury intrusion comprising polymerizing a vinyl halide monomer or mixtures of a vinyl halide monomer with at least one ethylenically-unsaturated comonomer that is copolymerizable therewith in the presence of a modifier represented by the formula:

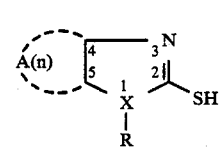

(I)

wherein X is N, S or O; R is H or lower alkyl with the proviso that when X is S or O, R is not present; and A, if present, taken together with the carbon atoms to which it is attached represents a benzene ring; and n represents 0 or 1 with the proviso that when n is 0, positions 4 and 5 of the heterocyclic ring are saturated or unsaturated.

2. The process of claim 1 wherein the modifier is selected from the group consisting of 2-mercaptobenzimidazole,
2-mercapto-1-methylimidazole, 2-mercaptothiazoline,
2-mercaptothiazole, 2-mercaptobenzothiazole,
2-mercaptoxazole, 2-mercaptoxazoline and
2-mercaptobenzoxazole.

3. The process of claim 1 wherein the vinyl halide is vinyl chloride.

4. The process of claim 1 wherein the polymerization is carried out at a temperature of from about 40° C. to about 80° C.

5. The process of claim 4 wherein the polymerization is carried out at about 70° C.

6. The process of claim 1 wherein the level of modifier is from about 0.01 to about 2.0 parts by weight per 100 parts by weight of vinyl chloride monomer.

7. The process of claim 1 wherein the resins produced have an I.V. of from about 0.1 to about 1.0 as measured by ASTM D-1243-66.

8. The process of claim 1 wherein the resins produced have a mercury intrusion porosity of from about 0.1 cc/g to about 1 cc/g.

* * * * *